UNITED STATES PATENT OFFICE.

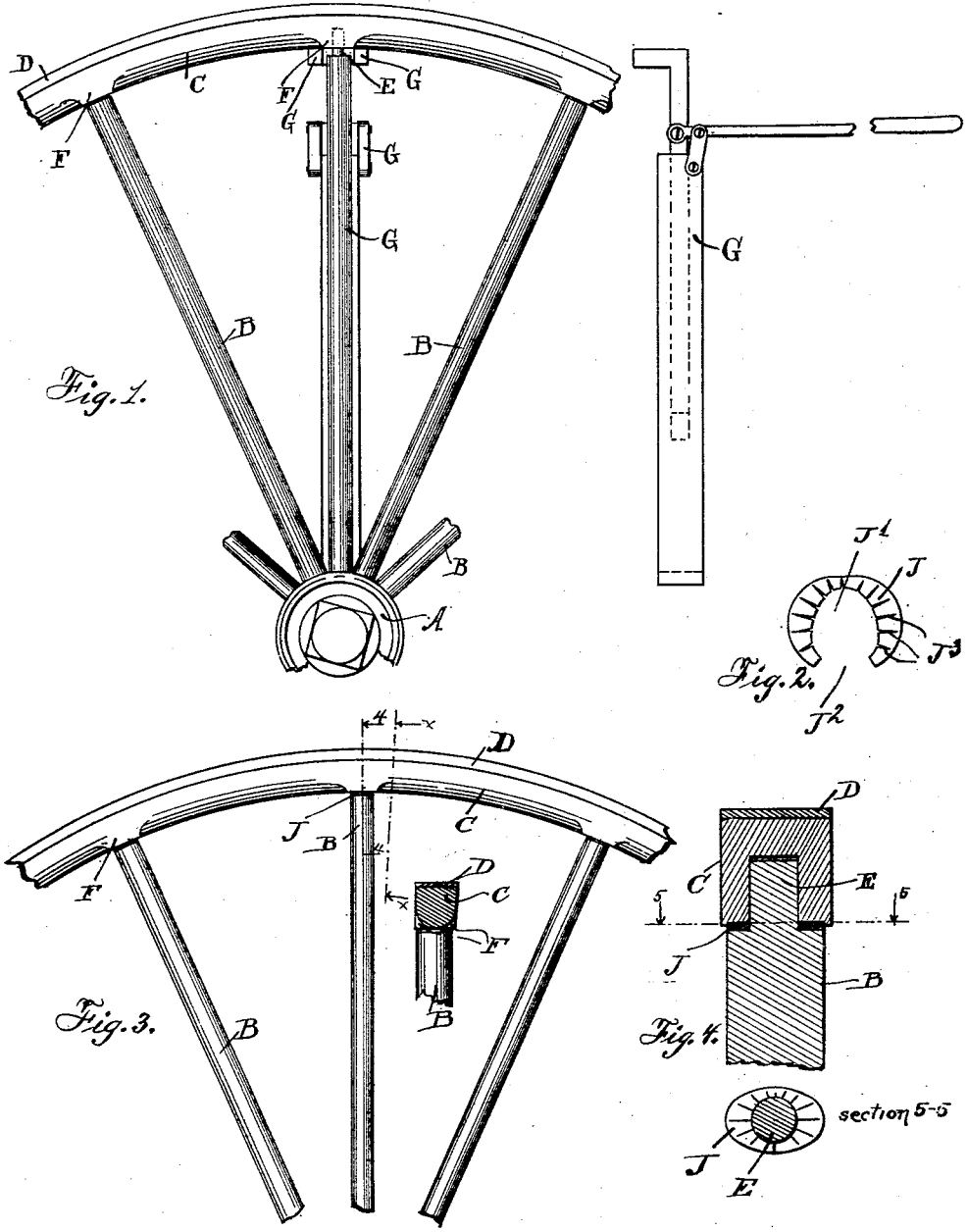

JAMES POLLOCK, OF MILLBURN, ILLINOIS.

TIRE-TIGHTENING WASHER.

SPECIFICATION forming part of Letters Patent No. 573,616, dated December 22, 1896.

Application filed September 3, 1896. Serial No. 604,755. (No model.)

*To all whom it may concern:*

Be it known that I, JAMES POLLOCK, a citizen of the United States, residing at Millburn, in the county of Lake and State of Illinois, have invented certain Improvements in Tire-Tightening Devices, of which the following is a specification.

My invention relates to tire-tightening washers.

Figure 1 shows a vehicle-wheel whose tire has become loosened, the felly having been raised in the process of tightening the tire. Fig. 2 is a view of a washer or tightening-collar which can be employed. Fig. 3 is a view of the same wheel with a certain number of these washers in position, the tire having thus been tightened. Fig. 4 is an enlarged sectional view through the end of the spoke and associated parts.

Like parts are indicated by the same letter in all the figures.

A is the hub of the wheel; B B, the spokes; C, the felly-sections; D, the tire. This constitutes an ordinary vehicle-wheel, all being made substantially in the same general form. As a rule the spokes are oval in cross-section, as indicated in the drawings. Each has a projecting part or pintle E, which is commonly round in cross-section. At the foot of this pintle a shoulder is formed by the end of the spoke. An enlarged portion F is commonly formed on the felly to receive this shoulder on the spoke. In the ordinary use of wheels the tire frequently becomes loosened. It will be found that this loosening effect is almost invariably accompanied by or, perhaps, associated with the sinking of the shoulder on the spoke into the wood of the felly. In short, a kind of recess is commonly formed there, as indicated.

The tire can be tightened by inserting a washer between the shoulder on the spoke and the felly, the felly having been first raised by a suitable tube. I have shown one tool used in this operation, which is indicated by the letter G. The tool is some sort of a jack which, having a bearing preferably on the hub, will engage the felly near the extremity of the spoke and slightly raise the same.

J is a washer, horseshoe-shaped, as shown, having an open interior J', a side opening $J^2$, and slots $J^3 J^3$. When the washer is cramped into position on the spoke, it is brought into the position indicated in the drawings, where it will be found that the exterior edge of the washer is in the form of an ellipse or oval to correspond with the oval of the cross-section of the spoke, and that the center of the washer is circular to correspond with the cross-section of the pintles. This washer has a series of slots $J^3 J^3$ on its extended side or edge, so as to permit it to be bent or cramped to bring its separated ends together. The separation between these two ends should be just enough to enable the washer to receive the pintle.

When the felly has been raised, as indicated in the drawings, so as to free the shoulder on the spoke from its opposed recess or cavity and to expose a portion of the face of the pintle, the washer will be forced into position, the pintle passing between its open ends and coming into the central space. Any proper cramping-tool is then employed to bring the two ends of the washer close together, whereupon the washer having been properly formed it will be found that its exterior edge corresponds to and is continuous with the surface of the spoke, while its inner edge fits snugly in the exterior surface of the pintle. The washer itself can be forced into position without having slots, but I prefer the slots or an equivalent thereof.

The shape of the washer should be such that when brought to position so that its inner aperture is circular the outer circumference will be in the form of the cross-section of the spoke, as, for example, oval. When the washer or other such device has been put into position after the felly has been lifted from the shoulder of the spoke, the washer or the like, being of the shape indicated, will form an exterior surface continuous with the exterior principal surface of the spoke and will also be, when the felly is relieved, seated in the recess or cavity formed by the shoulder. When so received into such recess or cavity, the washer or the like is prevented from changing its shape or position and forms a smooth and neat finish, the only effect being that the spoke is thus slightly lengthened. Now when a tire is found to be loose these devices can be applied in this manner at any number of spokes, and as the tire still continues to loosen other spokes can be so treated from time to time. The additional "length," so to speak, imparted in this manner to each spoke is so slight as not to materially interfere with the shape of the wheel, and as soon as enough washers have been put in to tighten the tire the operation is discontinued. Of course it will be understood that these washers or the like are to be furnished in various sizes and shapes to conform to the standard patterns of spokes.

The washer is provided with a series of inner notches, so as to permit the metal, which is of considerable thickness and great strength, to be cramped or crimped into its final form without breaking and without making undesirable ridges or folds in the metal.

I claim—

As a new article of manufacture, a tire-tightening washer comprising a flat substantially horseshoe-shaped piece of rigid metal having its ends separated by a distance equal to its inner diameter when the ends are closed, having also a series of inner notches so that the ends can be closed without breaking the metal, and shaped so that when closed it forms a ring with an inner circle and a substantially uniform outer elliptical circumference, substantially as and for the purpose specified.

JAMES POLLOCK.

Witnesses:
FRANCIS W. PARKER,
FRANCIS M. IRELAND.